US007578504B2

United States Patent
Tsai et al.

(10) Patent No.: US 7,578,504 B2
(45) Date of Patent: Aug. 25, 2009

(54) DUPLEX AUTOMATIC DOCUMENT FEEDER

(75) Inventors: Chen-Tsai Tsai, Taipei (TW);
Keng-Wei Shih, Taipei (TW);
Hsuan-Yang Lin, Taipei (TW)

(73) Assignee: Lite-On Technology Corp., Taipei (TW)

( * ) Notice: Subject to any disclaimer, the term of this patent is extended or adjusted under 35 U.S.C. 154(b) by 176 days.

(21) Appl. No.: 11/699,374

(22) Filed: Jan. 30, 2007

(65) Prior Publication Data

US 2008/0067736 A1 Mar. 20, 2008

(30) Foreign Application Priority Data

Sep. 15, 2006 (TW) ............................... 95134205 A

(51) Int. Cl.
*B65H 39/10* (2006.01)
(52) U.S. Cl. ................. 271/301; 271/302; 271/303; 271/304; 271/225; 271/184; 271/186; 271/3.14; 271/3.18; 271/3.19
(58) Field of Classification Search ............... 271/3.14, 271/3.18, 3.19, 225, 301, 302, 303, 304, 271/184, 186
See application file for complete search history.

(56) References Cited

U.S. PATENT DOCUMENTS

| | | | | |
|---|---|---|---|---|
| 4,871,163 A | * | 10/1989 | Landa et al. ................. 271/225 |
| 4,958,828 A | * | 9/1990 | Saito .......................... 271/186 |
| 5,234,213 A | * | 8/1993 | Chen .......................... 271/303 |
| 5,784,680 A | * | 7/1998 | Taruki ........................ 399/374 |
| 5,887,865 A | * | 3/1999 | Ishimaru ..................... 271/4.1 |
| 6,209,861 B1 | * | 4/2001 | Kakuta et al. ............... 271/3.02 |
| 6,288,768 B1 | * | 9/2001 | Ichinose et al. ............... 355/23 |
| 6,321,064 B1 | * | 11/2001 | Mizubata et al. ............ 399/370 |
| 6,381,439 B2 | * | 4/2002 | Hirota et al. ................ 399/374 |
| 6,393,251 B2 | * | 5/2002 | Kono .......................... 399/370 |
| 6,434,359 B2 | * | 8/2002 | Nose et al. .................. 399/374 |
| 6,522,860 B2 | * | 2/2003 | Nose et al. .................. 399/374 |
| 6,970,272 B2 | | 11/2005 | Nanno |
| 2007/0080495 A1 | * | 4/2007 | Tu ............................. 271/274 |
| 2008/0067736 A1 | * | 3/2008 | Tsai et al. ................... 271/186 |

\* cited by examiner

*Primary Examiner*—Patrick H Mackey
*Assistant Examiner*—Prasad V Gokhale
(74) *Attorney, Agent, or Firm*—Rosenberg, Klein & Lee

(57) ABSTRACT

An automatic document feeder includes first, second, third, and fourth paths for guiding movement of a document. The document is fed through the first path and a scanning module so as to allow for scanning of a first side surface of the document. Thereafter, a switching gate is pivoted to a first position so as to allow the document to be moved from a front section of the second path onto a roller unit via the fourth path and a rear section of the third path. The rotational direction of the middle roller is changed in response to movement of the document onto the roller unit so as to allow the document to be moved onto the first path via the third path, thereby allowing for a subsequent scanning operation on a second side surface of the document. The automatic document feeder further includes a document-inverting path such that documents are automatically arranged according to paper number.

10 Claims, 12 Drawing Sheets

DUPLEX AUTOMATIC DOCUMENT FEEDER

CROSS-REFERENCE TO RELATED APPLICATION

This application claims priority of Taiwanese Application No. 095134205, filed on Sep. 15, 2006.

BACKGROUND OF THE INVENTION

1. Field of the Invention

This invention relates to an automatic document feeder, and more particularly to a duplex automatic document feeder.

2. Description of the Related Art

Referring to FIG. 1, a compact auto-document feeder 1 disclosed in U.S. Pat. No. 5,784,680 includes a document setting tray 11, a scanning module 12, an ejecting tray 13, and a switching gate 14. A first transfer path 101 extends from the document setting tray 11 to the scanning module 12. A second transfer path 102 extends from the scanning module 12 to the ejecting tray 13. A third transfer path 103 extends from a downstream end of the second transfer path 102 to the first transfer path 101. The switching gate 14 is disposed among the second, third, and fourth transfer paths 102, 103, 104. Operations of the feeder 1 performed on one document will be described hereinafter.

When the feeder 1 is operated in a simplex document-feeding mode, the document is fed from the document-setting tray 11, and is moved through the first transfer path 101 and the scanning module 12 for scanning of the document. Subsequently, the document is moved onto the ejecting tray 13 through the second transfer path 102 with the switching gate 14 being disposed in a first position shown by the solid lines in FIG. 1.

When the feeder 1 is operated in a duplex document-feeding mode, the document is moved from the first transfer path 101 onto the second transfer path 102 for scanning of a first side surface thereof. At the same time, the switching gate 14 is pivoted to a second position shown by the phantom lines in FIG. 1. Hence, the document is moved from the second transfer path 102 onto the fourth transfer path 104 and a roller unit 16. Thereafter, the rotational directions of rollers of the roller unit 16 are changed so as to return the document to the first transfer path 101 via the third transfer path 103. Thus, the document is moved from the first transfer path 101 onto the second transfer pat 102 once again so as to allow for scanning of a second side surface thereof. After completion of the scanning of the first and second side surfaces of the document, in order to enable ejection of the document with the first side surface of the document facing downwardly, the document must be further moved through a document-inverting path defined by the third transfer path 103, a downstream portion of the first transfer path 101, and the second transfer path 102 so as to drop from the downstream end of the second transfer path 102 onto the ejecting tray 13.

The feeder 1 has the following disadvantages:
(1) The document-inverting path is long, thereby reducing the operating efficiency of the feeder 1.
(2) Referring to FIG. 2, before a trailing end 151 of the document is moved from the roller unit 16, a leading end 152 of the document may be moved onto the roller unit 16, thereby resulting in occurrence of a paper jam.

Referring to FIG. 3, to solve the paper jam problem, a duplex automatic document feeder 2 disclosed in US Patent Application publication no. 2002/0054382 includes first, second, third, and fourth document-feeding paths 201, 202, 203, 204, a scanning module 22, a middle roller 23, an upper roller 24, and a lower roller 25. Relative positions among the first, second, and third document-feeding paths 201, 202, 203, as well as the scanning module 22 are similar to those of U.S. Pat. No. 5,784,680. The fourth document-feeding path 204 is U-shaped, and has upper and lower horizontal sections 205, 206, and a curved section 207. The middle roller 23 is disposed between the upper and lower horizontal sections 205, 206. The upper and lower rollers 24, 25 are in frictional contact with the middle roller 23, and are respectively adjacent to the upper and lower horizontal sections 205, 206 of the fourth document-feeding path 204. After completion of a second scanning operation, the document is moved from the second document-feeding path 202 onto the lower horizontal section 206 of the fourth document-feeding path 204. When the document is moved into a space between the middle roller 23 and the lower roller 25, the rotational directions of the middle roller 23 and the lower roller 25 are changed so as to allow the document to be moved onto the curved section 207 and the upper horizontal section 205 of the fourth document-feeding path 204, thereby passing through a space between the middle roller 23 and the upper roller 24. Finally, the document is moved from the middle roller 23 and the upper roller 24 onto a discharging tray (not shown).

The lower roller 25 is movable relative to the middle roller 23 between upper and lower positions shown respectively by the solid and phantom lines in FIG. 3 through operation of an elevating mechanism (not shown). When the lower roller 25 is moved to the lower position, two documents can be moved in two opposite directions through the space between the middle roller 23 and the lower roller 25, thereby preventing occurrence of a paper jam.

However, the structure of the feeder 2 is complex due to the presence of the elevating mechanism. This increases the manufacturing costs of the feeder 2.

SUMMARY OF THE INVENTION

The object of this invention is to provide a duplex automatic document feeder that can overcome the above mentioned disadvantages associated with the prior art.

According to this invention, an automatic document feeder includes first, second, third, and fourth paths for guiding movement of a document. The document is fed through the first path and a scanning module so as to allow for scanning of a first side surface of the document. Thereafter, a switching gate is pivoted to a first position so as to allow the document to be moved from a front section of the second path onto a roller unit via the fourth path and a rear section of the third path. The rotational direction of the middle roller is changed in response to movement of the document onto the roller unit so as to allow the document to be moved onto the first path via the third path, thereby allowing for a subsequent scanning operation on a second side surface of the document. The automatic document feeder further includes a document-inverting path such that ejected documents are automatically arranged according to paper number.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
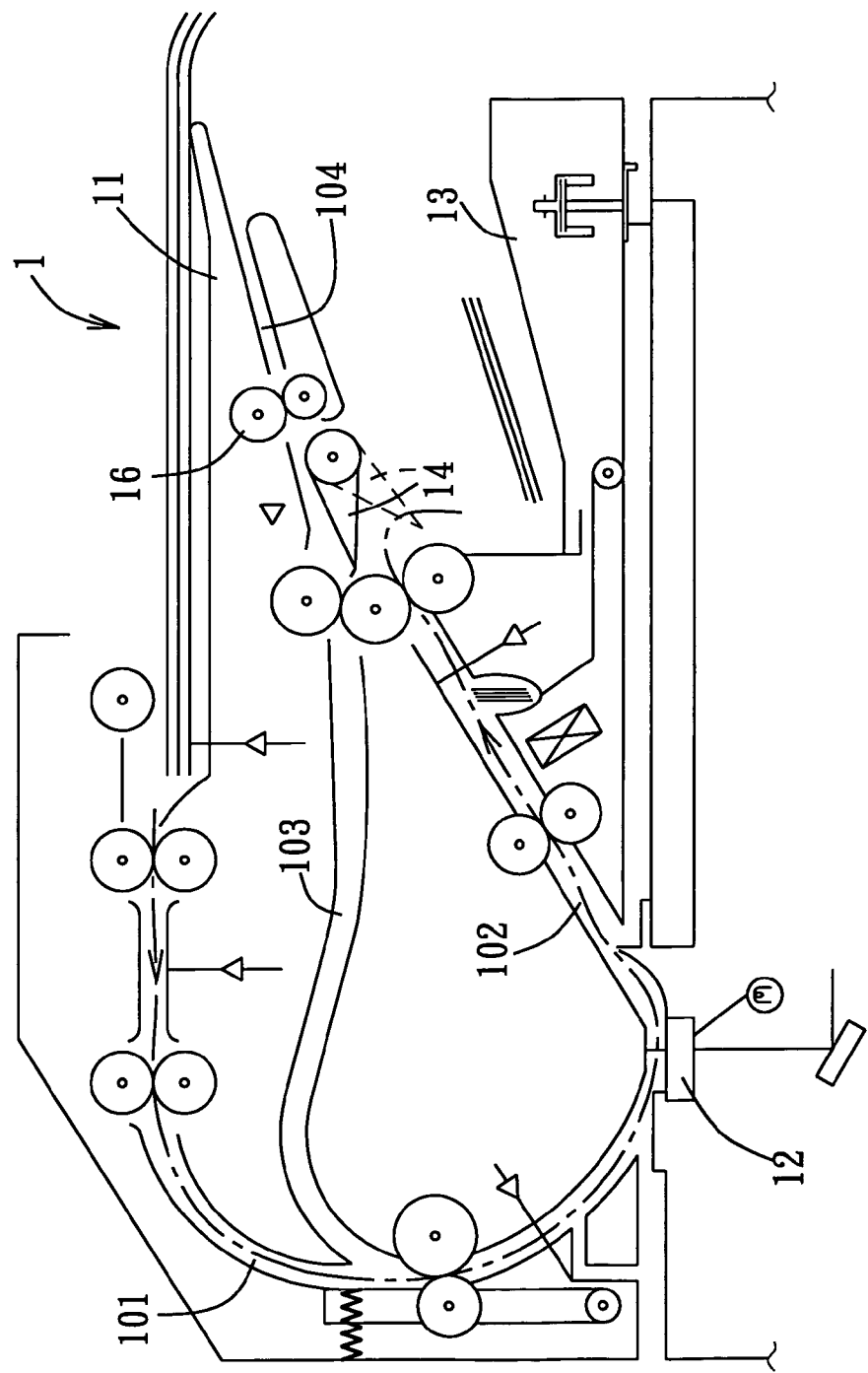
FIG. 1 is a schematic side view of a compact auto-document feeder disclosed in U.S. Pat. No. 5,784,680.
Figure 2:
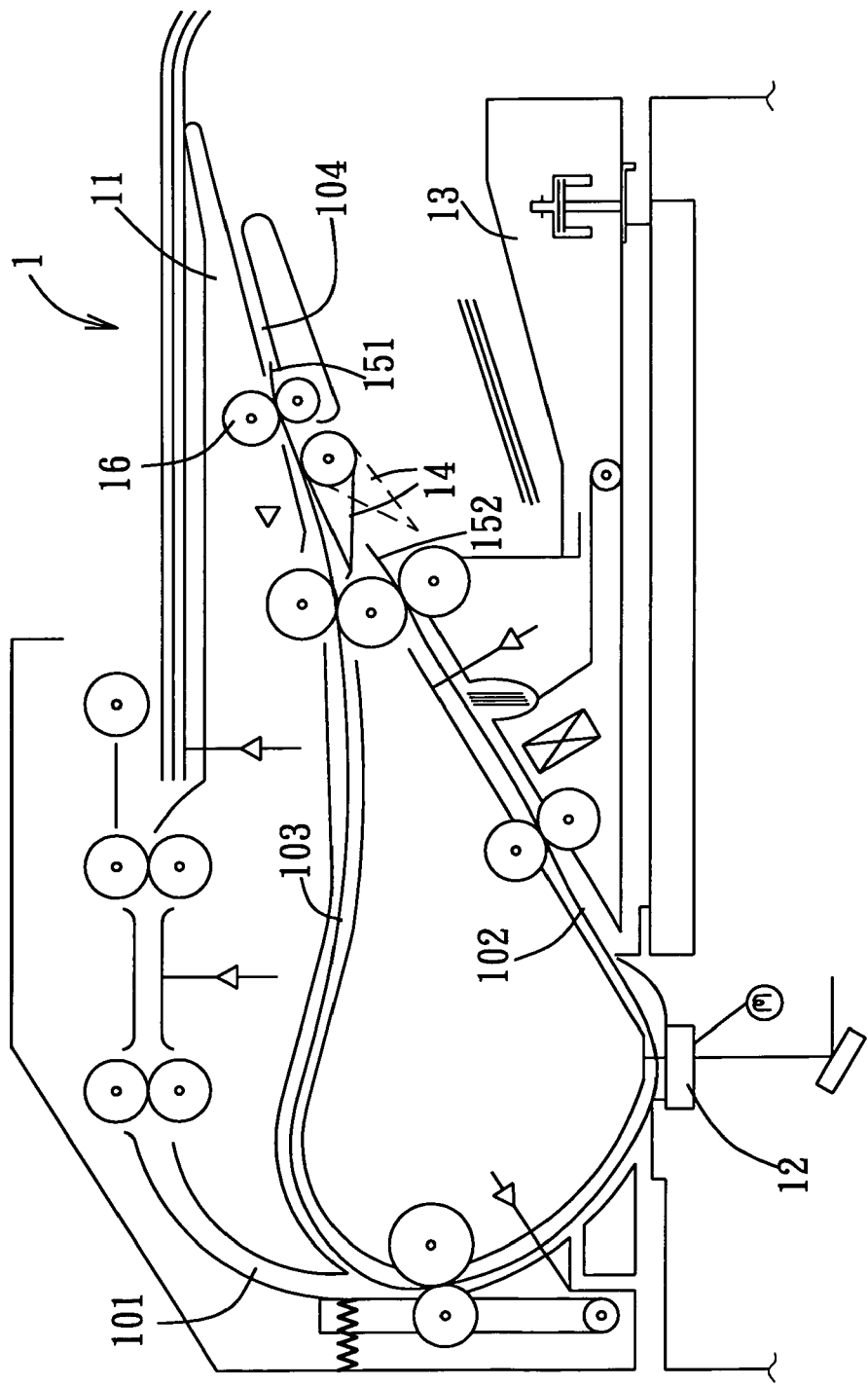
FIG. 2 is a schematic side view of the compact auto-document feeder, illustrating how a paper jam may occur between second and third transfer paths.

Before the present invention is described in greater detail in connection with the preferred embodiments, it should be noted that similar elements and structures are designated by like reference numerals throughout the entire disclosure.

The duplex automatic document feeder of this invention is applicable to a copy machine, a fax machine, a scanner, or other image forming devices. In each of the following embodiments, this invention is described in an exemplary application to a copy machine.

Figure 4:
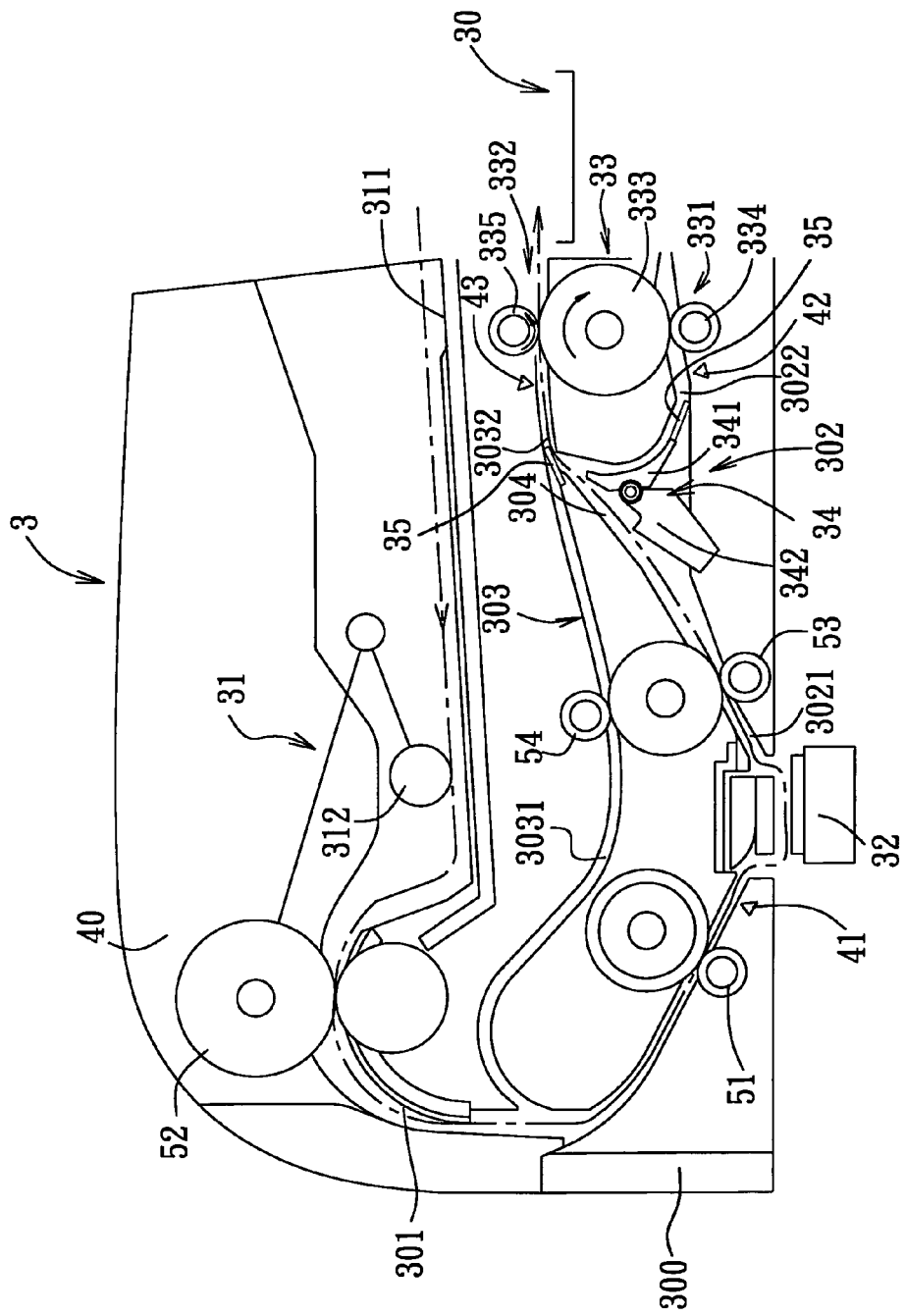
FIG. 4 is a schematic side view of the first preferred embodiment of a duplex automatic document feeder according to this invention when a switching gate is disposed in a first position.
Figure 5:
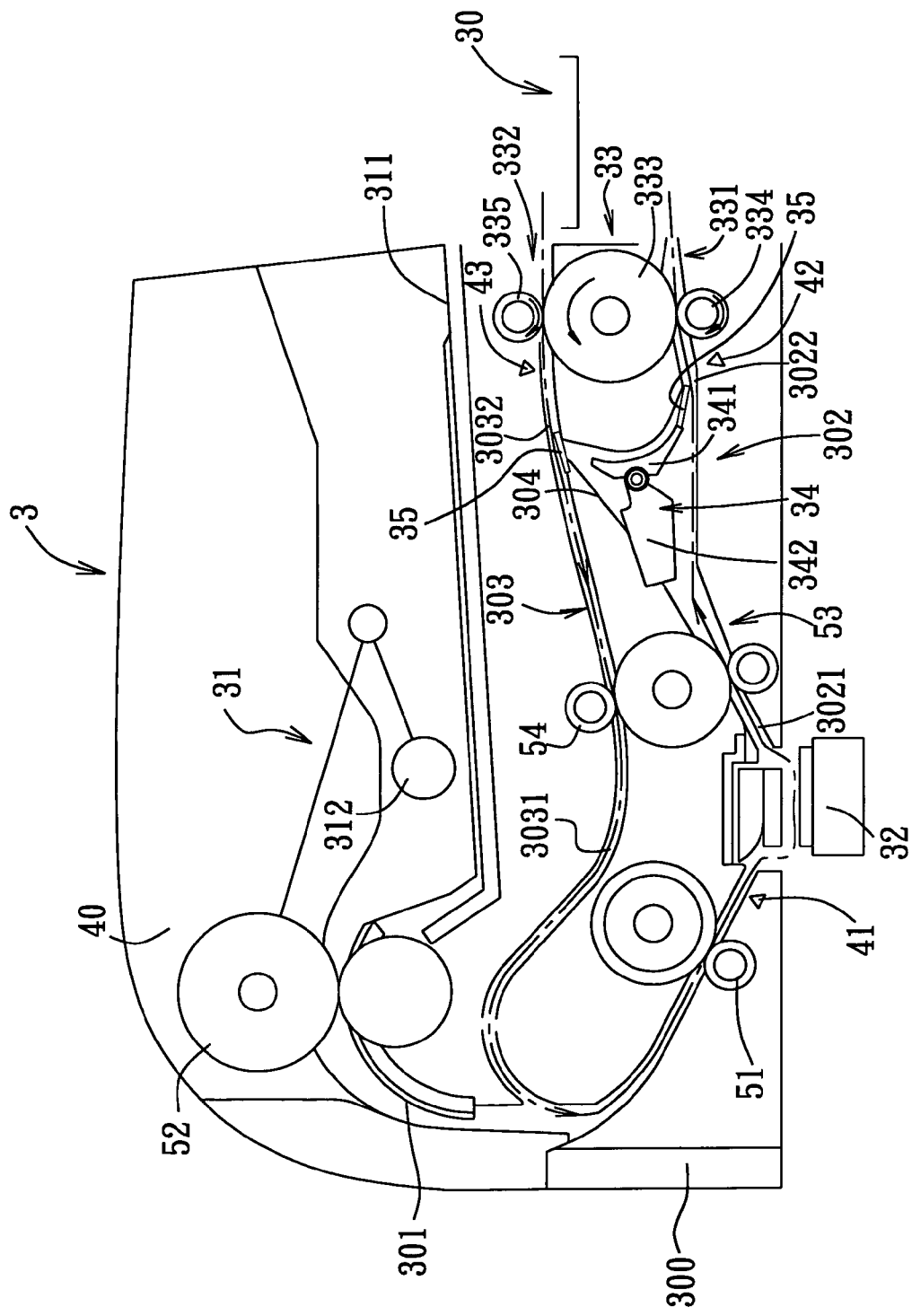
FIG. 5 is a schematic side view of the first preferred embodiment when the switching gate is disposed in a second position.

Referring to FIGS. 4 and 5, the first preferred embodiment of a duplex automatic document feeder 3 according to this invention includes a feeding/separating module 31, a scanning module 32, a reversing mechanism 33, a guide unit 34, a controller (not shown), a path unit, and a sensor unit including a plurality of sensors that will be described hereinafter. The path unit includes first, second, third, and fourth paths 301, 302, 303, 304.

The feeding/separating module 31 serves as a feeding end of the feeder 3, and includes a feeding tray 311 disposed under a top cover 40, and a feeding/separating roller 312. The scanning module 32 is disposed under the feeding/separating module 31, and is used to scan documents. The first path 301 guides movement of the document from the feeding/separating module 31 to the scanning module 32. A sensor 41 and a transfer roller unit 51 are disposed in proximity to the first path 301 and the scanning module 32, and in front of the scanning module 32. A pick-up roller unit 52 is disposed between an upstream end of the first path 301 and the feeding/separating roller 312. A stack of documents (not shown) to be scanned can be placed on the feeding tray 311 such that the uppermost document is in frictional contact with the feeding/separating roller 312. The feeding/separating roller 312 is driven by a motor (not shown) to move the uppermost document onto the first path 301.

The reversing mechanism 33 is disposed behind the scanning module 32 (i.e., at the right side of FIG. 1), and includes a first roller unit 331 and a second roller unit 332 disposed above and adjacent to the first roller unit 331.

The second path 302 extends from the downstream end of the first path 301 to the first roller unit 331, and has a front section 3021, and a rear section 3022 disposed behind the front section 3021 and in front of the first roller unit 331. A transfer roller unit 53 is disposed at a middle portion of the front section 3021. A sensor 42 is disposed in proximity to the rear section 3022 and the first roller unit 331, and in front of the first roller unit 331.

The third path 303 is spaced apart from and disposed above the second path 302, and extends between the second roller unit 332 and the first path 301. Similar to the second path 302, the third path 303 has front and rear sections 3031, 3032 in spatial communication with an intermediate portion of the first path 301 and the second roller unit 332, respectively. A transfer roller unit 54 is disposed at the front section 3031. A sensor 43 is disposed in proximity to the rear section 3032 and the second roller unit 332, and in front of the second roller unit 332.

The first and second roller units 331, 332 have a common middle roller 333 disposed between the rear sections 3022, 3032 of the second and third paths 302, 303. The first roller unit 331 further includes a lower roller 334 in frictional contact with the middle roller 333 and disposed behind the rear section 3022 of the second path 302. The second roller unit 332 further includes an upper roller 335 in frictional contact with the middle roller 333 and disposed behind the rear section 3032 of the third path 303. As such, when the middle roller 333 is rotated in a direction by a motor (not shown), the upper and lower rollers 335, 334 rotate in the opposite direction due to frictional contact therewith.

The fourth path 304 has an upstream end in spatial communication with a junction between the front and rear sections 3021, 3022 of the second path 302, and a downstream end in spatial communication with a junction between the front and rear sections 3031, 3032 of the third path 303. The ejecting tray 30 is disposed behind and in proximity to the second roller unit 332, and serves as an outlet end of the feeder 3.

The guide unit 34 is disposed at a junction between the second and fourth paths 302, 304, and includes a fixed guiding member 341 and a switching gate 342. The fixed guiding member 341 is disposed fixedly in a housing unit 300, and has a curved guiding surface 3411 that extends between the rear section 3022 of the second path 302 and the fourth path 304 so as to guide movement of the document from the rear section 3022 of the second path 302 onto the fourth path 304. The switching gate 342 is disposed pivotally on the fixed guiding member 341, and is controlled by activation of a solenoid valve (not shown) by the controller to pivot between a first position shown in FIG. 4 and a second position shown in FIG. 5. The solenoid valve may be replaced with a stepping motor or other controlling mechanism. With particular reference to FIG. 4, in the first position, a free end of the switching gate 342 is pivoted onto the rear section 3022 of the second path 302 so as to prevent movement of the document from the front section 3021 of the second path 302 onto the rear section 3022 of the second path 302 while allowing movement of the document from the front section 3021 of the second path 302 onto the fourth path 304. With particular reference to FIG. 5, in the second position, the free end of the switching gate 342 is pivoted onto the fourth path 304 so as to prevent movement of the document from the front section 3021 of the second path 302 onto the fourth path 304 while allowing movement of the document from the front section 3021 of the second path 302 onto the rear section 3022 of the second path 302.

A one-way valve 35 in the form of a polyester film is disposed at the junction between the front and rear sections 3031, 3032 of the third path 303 so as to allow for movement of the document from the fourth path 304 onto the rear section 3032 of the third path 303 while preventing movement of the document from the rear section 3032 of the third path 303 onto the fourth path 304.

Again referring to FIG. 4, when the feeder 3 is operated in a simplex document-feeding mode on one document, the switching gate 342 is disposed constantly in the first position. The document is fed onto the first path 301 by the feeding/separating roller 31, and is moved through the scanning module 32 by the pick-up roller unit 52 and the transfer roller unit 51. When the document is moved onto the second path 302, it is guided by the switching gate 342 onto the second roller unit 332 via the fourth path 304. As such, the document can be moved from the feeding tray 311 onto the ejecting tray 30 along a first-side scanning path shown by the phantom lines in FIG. 4.

When the feeder 3 is operated in a duplex document-feeding mode on one document, the document is first moved from the feeding tray 311 onto the ejecting tray 30 along the first-side scanning path for scanning of a first side surface of the document. With particular reference to FIG. 5, as soon as a leading end of the document is moved into a space between the middle roller 333 and the upper roller 335, the sensor 43 outputs a signal to the controller. Hence, the controller activates the motor so as to change the rotational direction of the middle roller 333. Subsequently, the document is moved onto the front section 3031 of the third path 303 and, thus, the first path 301 by the second roller unit 332 and the transfer roller unit 54. At the junction between the first and third paths 301, 303, the document is guided to pass through the transfer roller 51 and the scanning module 32 for scanning of a second side surface thereof. At the same time, the switching gate 342 is pivoted to the second position through operation of the controller activating the solenoid valve upon receiving a signal from the sensor 41 so as to allow the document to be moved onto the first roller unit 331 via the rear section 3022 of the second path 302. When the leading end of the document is moved into a space between the middle roller 333 and the lower roller 334, the sensor 42 outputs a signal to the controller. Thus, the motor is controlled by the controller to change the rotational direction of the middle roller 333, and the document is moved by the first roller unit 331 onto the fourth path 304 and the second roller unit 332 through guiding of the fixed guiding member 341. As a result, when the document is moved from the second roller unit 332 onto the ejecting tray 30, the first side surface of the document faces downwardly. That is to say, ejected documents are automatically arranged according to paper numbers.

Figure 3:
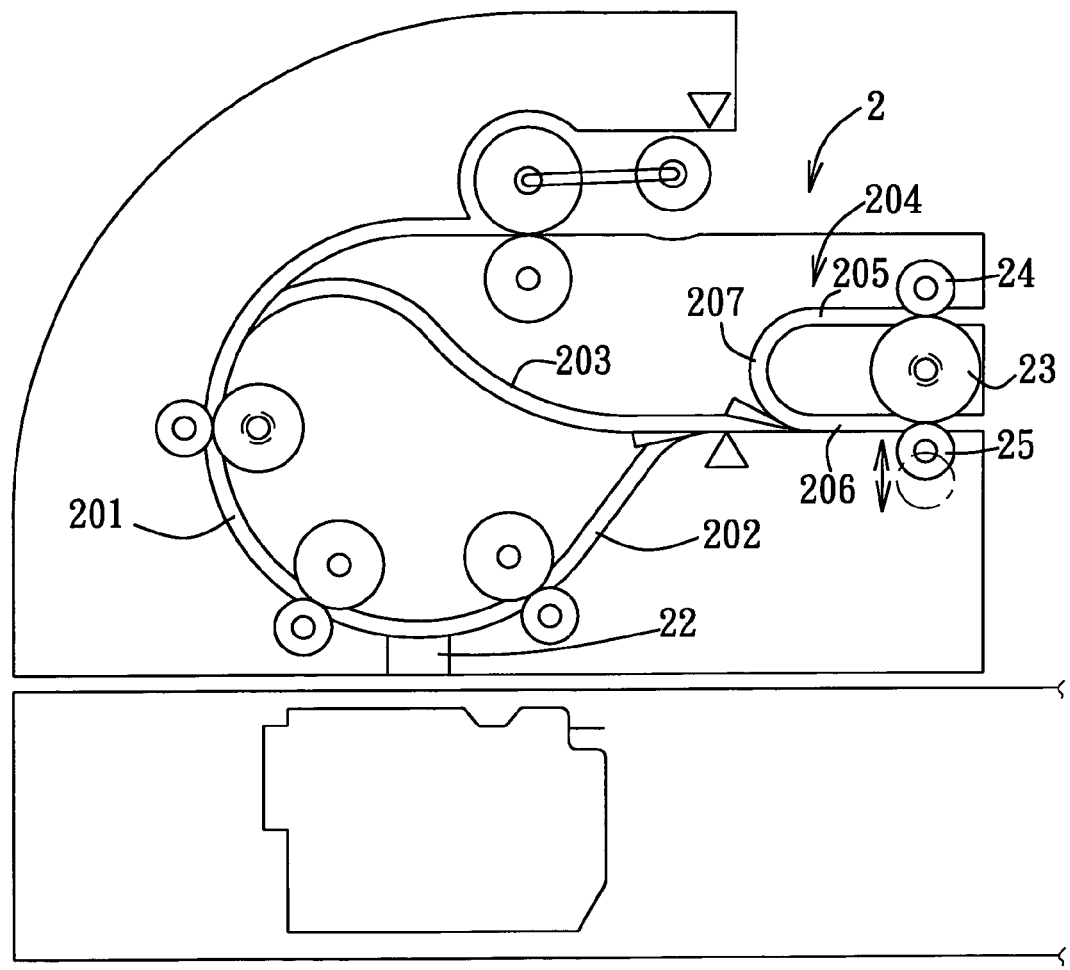
FIG. 3 is a schematic side view of a duplex automatic document feeder disclosed in US Patent Application publication no. 2002/0054382.

Due to the presence of the fourth path 304, paper jams can be prevented, and the distance traveled by the document is reduced significantly, thereby improving the operating efficiency of the feeder 3 as compared to that of U.S. Pat. No. 5,784,680. Furthermore, the structure for changing the position of the switching gate 342 is simpler than that for moving the lower roller 25 (see FIG. 3) disclosed in US Patent Application publication no. 2002/0054382.

Figure 6:
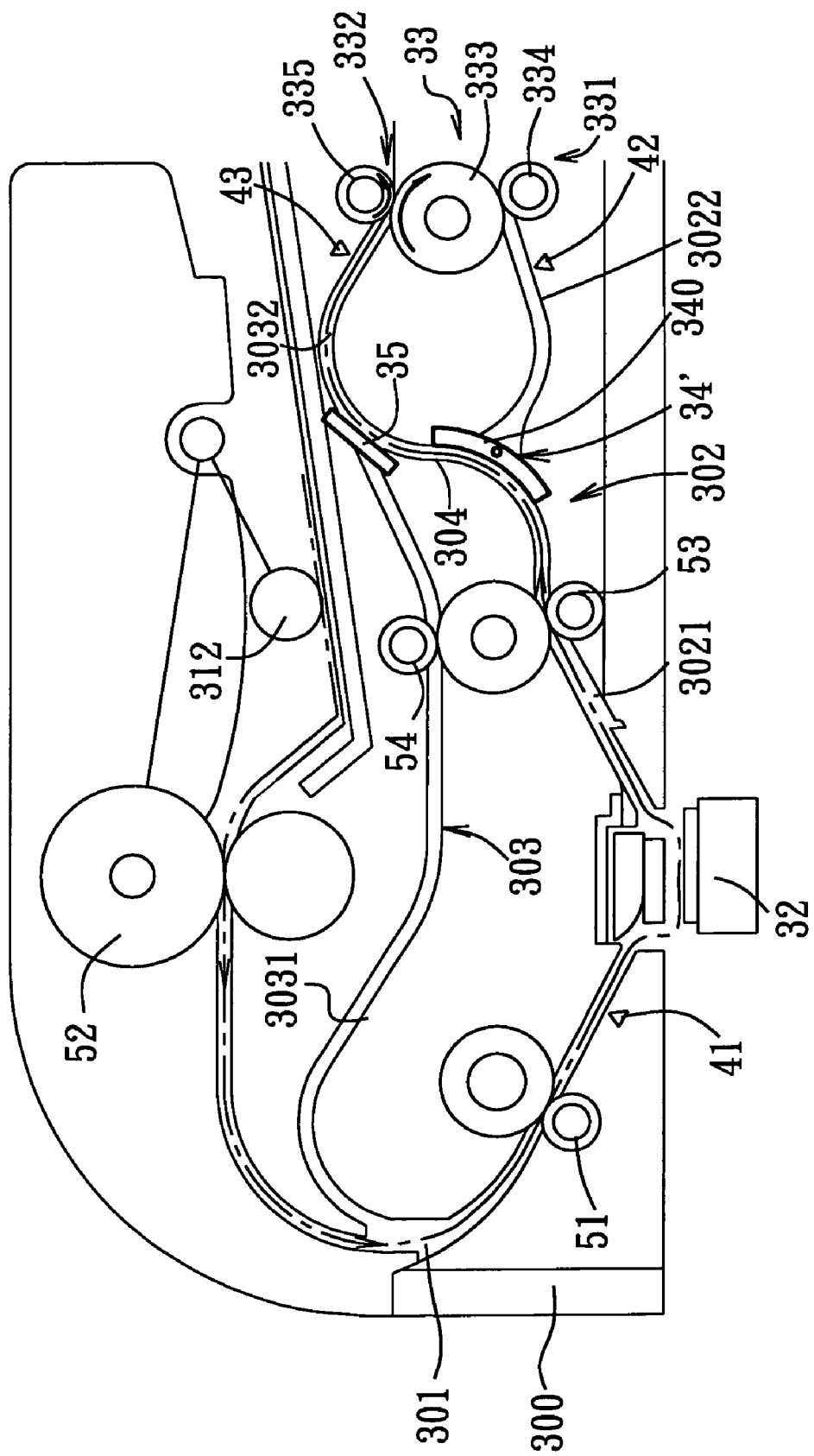
FIG. 6 is a schematic side view of the second preferred embodiment of a duplex automatic document feeder according to this invention, illustrating a first-side scanning path.
Figure 7:
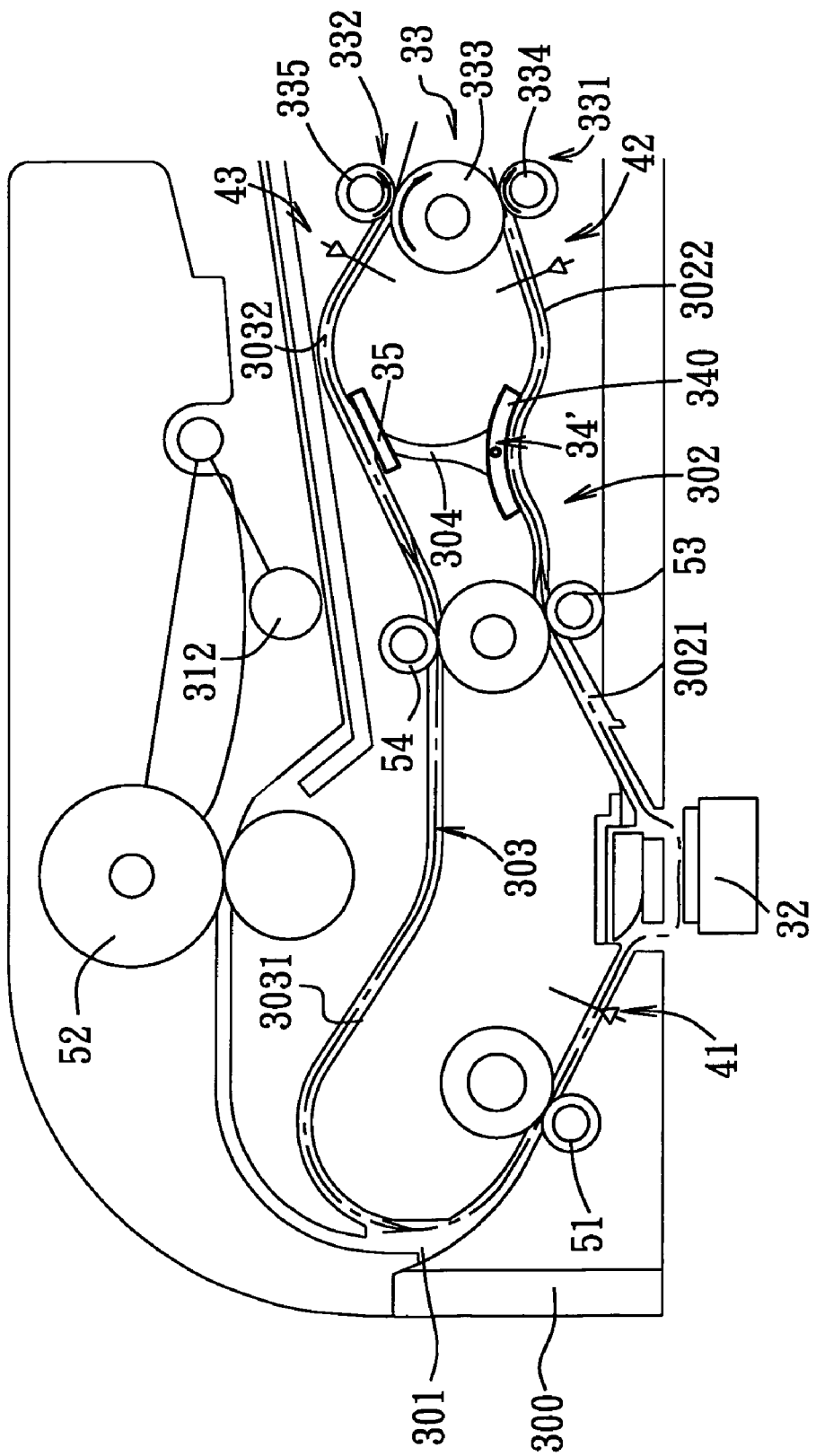
FIG. 7 is a schematic side view of the second preferred embodiment, illustrating a second-side scanning path.
Figure 8:
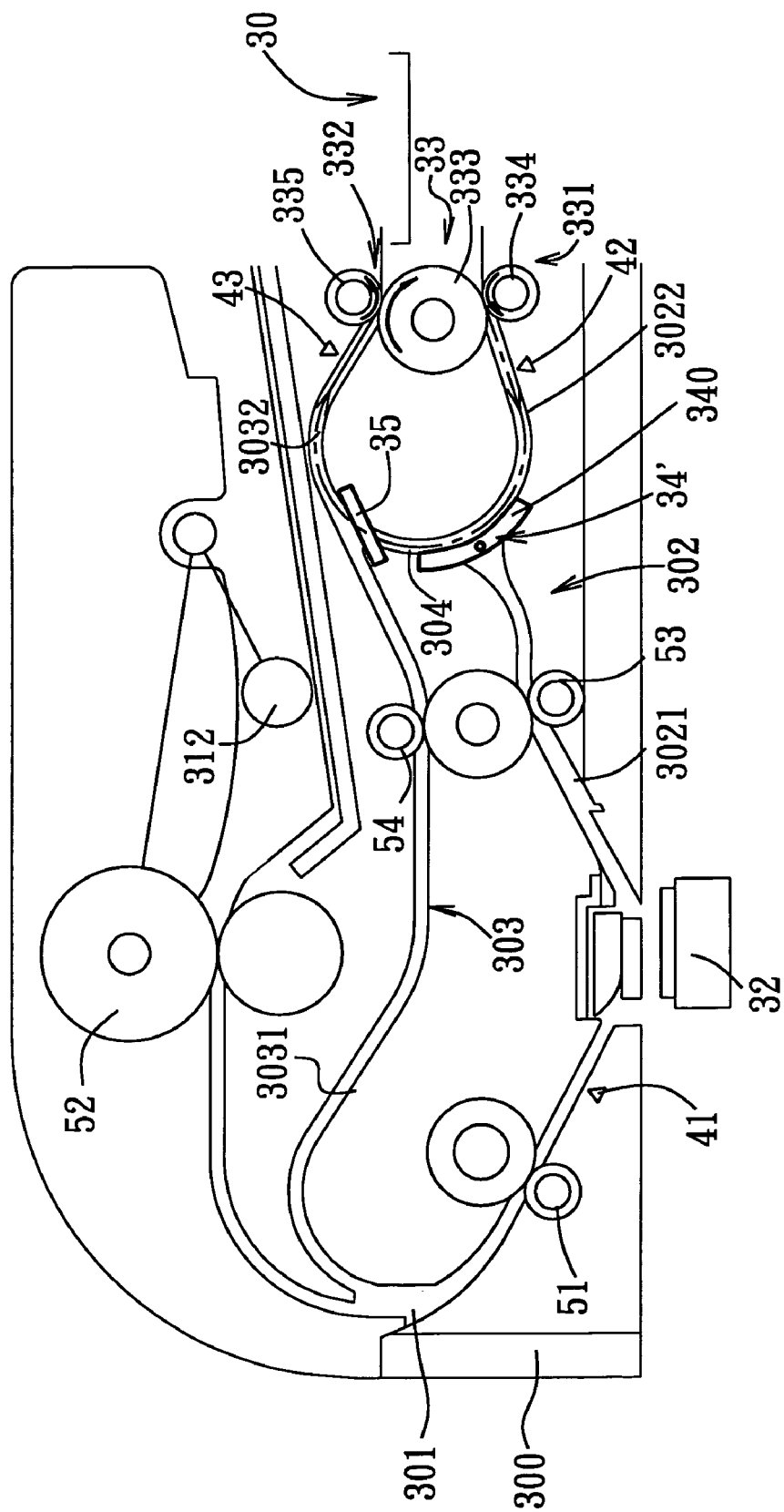
FIG. 8 is a schematic side view of the second preferred embodiment, illustrating a document-inverting path.
Figure 9:
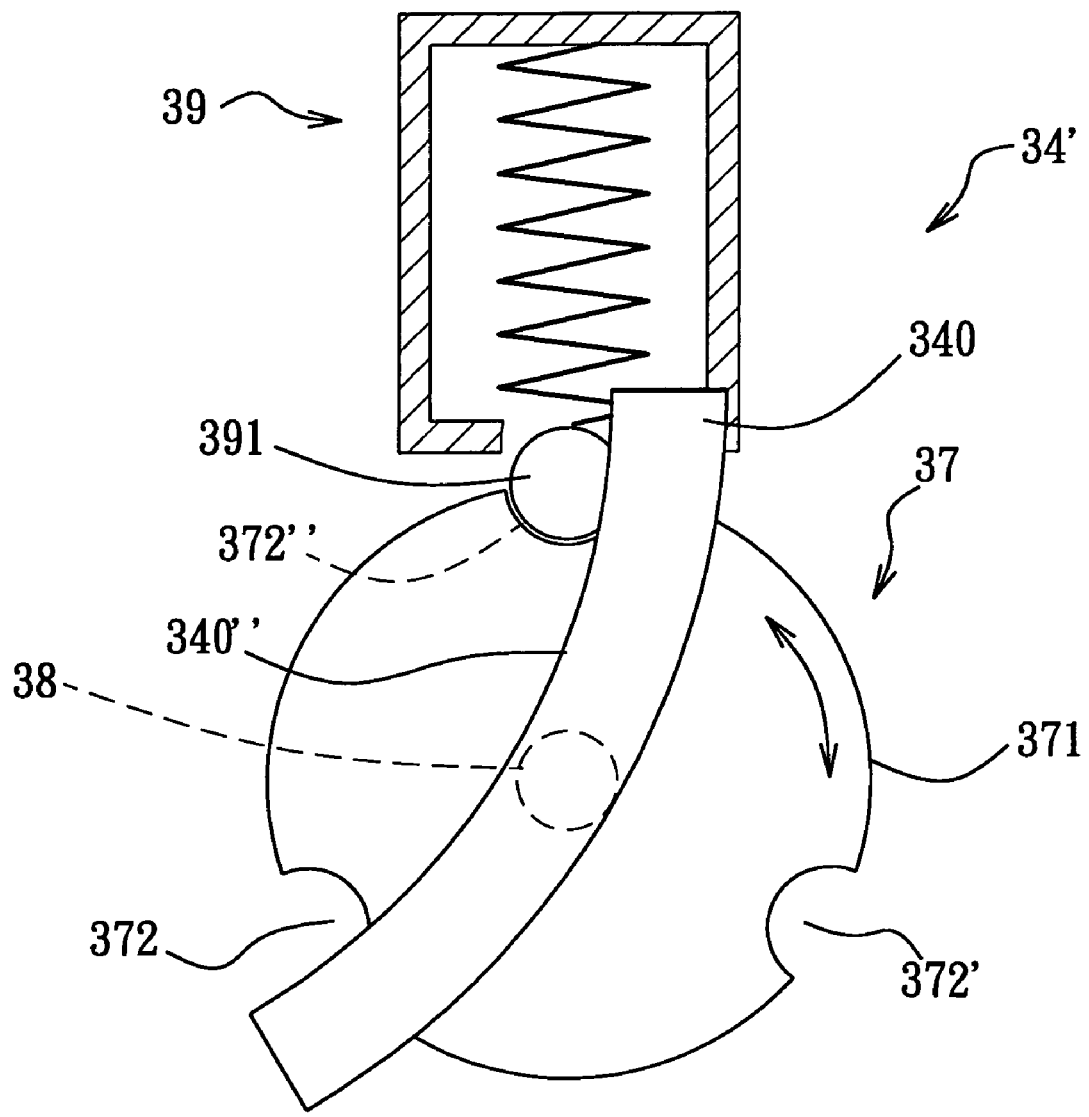
FIG. 9 is a schematic side view of a guide unit of the second preferred embodiment.

FIGS. 6, 7, 8, and 9 show the second preferred embodiment of a duplex automatic document feeder according to this invention. In contrast to the first preferred embodiment, the guide unit 34' includes a switching gate 340 configured as a curved rod, a rotary disk 37, and a solenoid valve 39. The rotary disk 37 is formed with an integral rotating shaft 38 that is connected fixedly to a middle portion of the switching gate 340 and that is disposed rotatably at the junction between the second and fourth paths 302, 304. The rotary disk 37 has an outer periphery formed with first, second, and third positioning notches 372, 372', 372". The solenoid valve 39 includes an engaging member 391 in the form of a ball. The engaging member 391 is biased to move into the first positioning notch 372 when the switching gate 340 is disposed in a first position shown in FIG. 6, into the second positioning notch 372' when the switching gate 340 is disposed in a second position shown in FIG. 7, and into the third positioning notch 372" when the switching gate 340 is disposed in a third position shown in FIG. 8. The solenoid valve 39 is activated so as to remove the engaging member 391 from the rotary disk 37 just before the switching gate 340 is pivoted in the housing unit 300. With particular reference to FIG. 6, in the first position, a curved guiding surface 340' of the switching gate 340 extends between the front section 3021 of the second path 302 and the fourth path 304. When the first scanning operation is completed, the switching gate 340 is disposed in this position so as to limit movement of the document from the front section 3021 of the second path 302 onto the fourth path 304. With particular reference to FIG. 7, in the second position, the curved guiding surface 340' of the switching gate 340 extends between the front and rear sections 3021, 3022 of the second path 302. When the second scanning operation is completed, the switching gate 340 is pivoted to this position so as to limit movement of the document from the front section 3021 of the second path 302 onto the rear section 3022 of the second path 302, thereby allowing for subsequent document-inverting operation. With particular reference to FIG. 8, in the third position, the curved guiding surface 340' of the switching gate 340 extends between the rear section 3022 of the second path 302 and the fourth path 304. When the document is moved from the first roller unit 33, the switching gate 340 is pivoted to this position so as to limit movement of the document from the rear section 3022 of the second path 302 onto the fourth path 304 and, thus, the rear section 3032 of the third path 303. Hence, the document is inverted and moved onto the ejecting tray 30.

Figure 10:
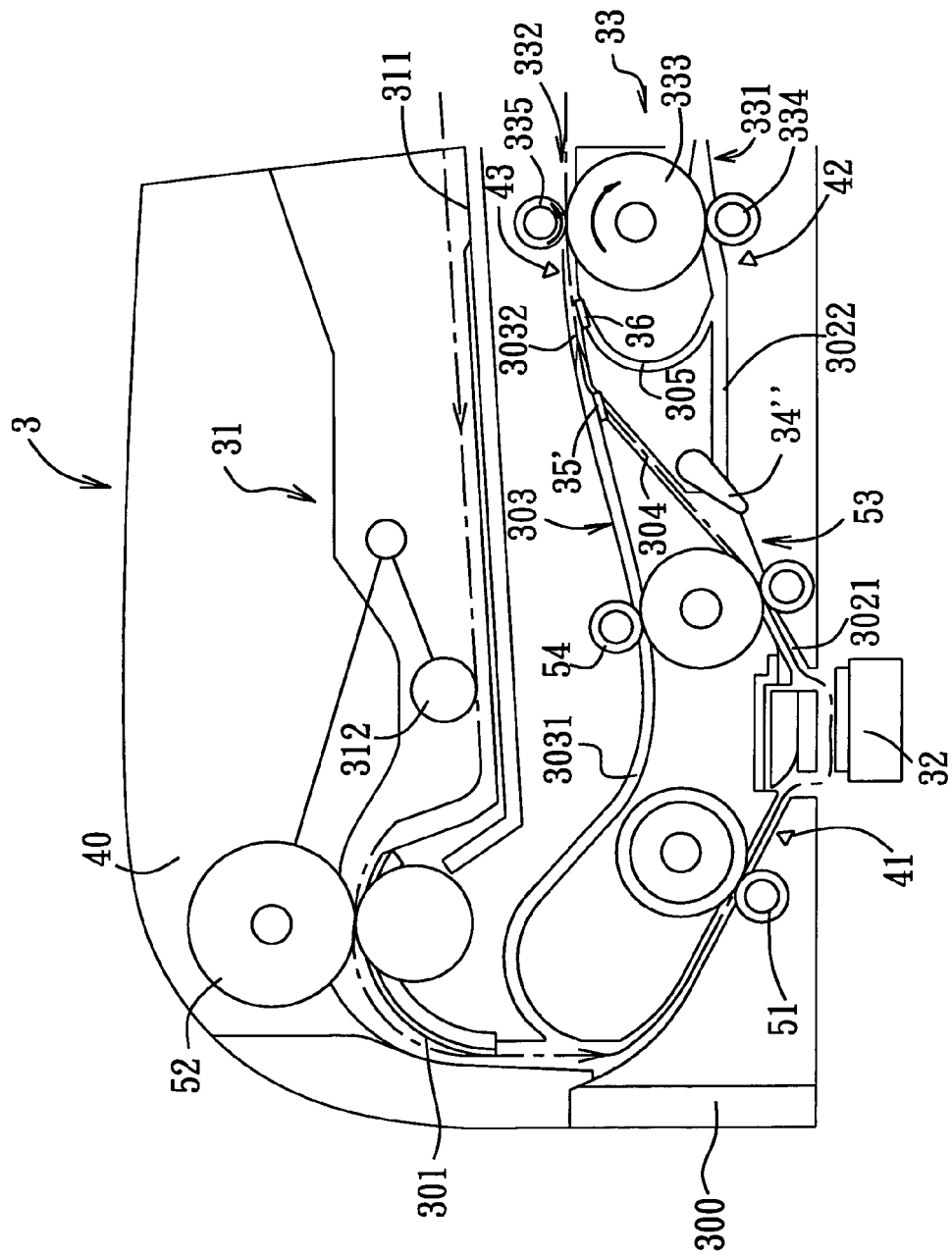
FIG. 10 is a schematic side view of the third preferred embodiment of a duplex automatic document feeder according to this invention, illustrating a first-side scanning path.
Figure 11:
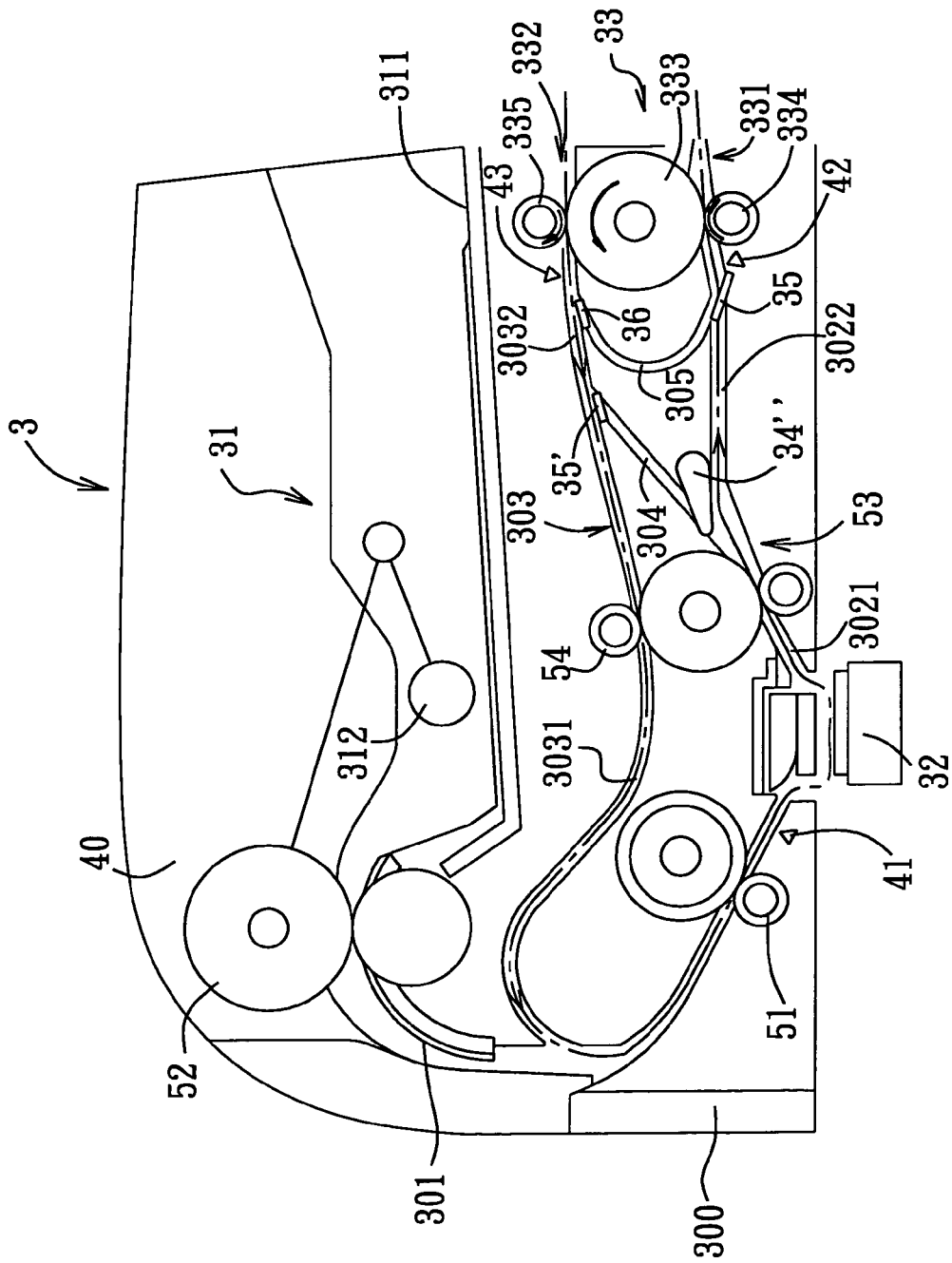
FIG. 11 is a schematic side view of the third preferred embodiment, illustrating a second-side scanning path.
Figure 12:
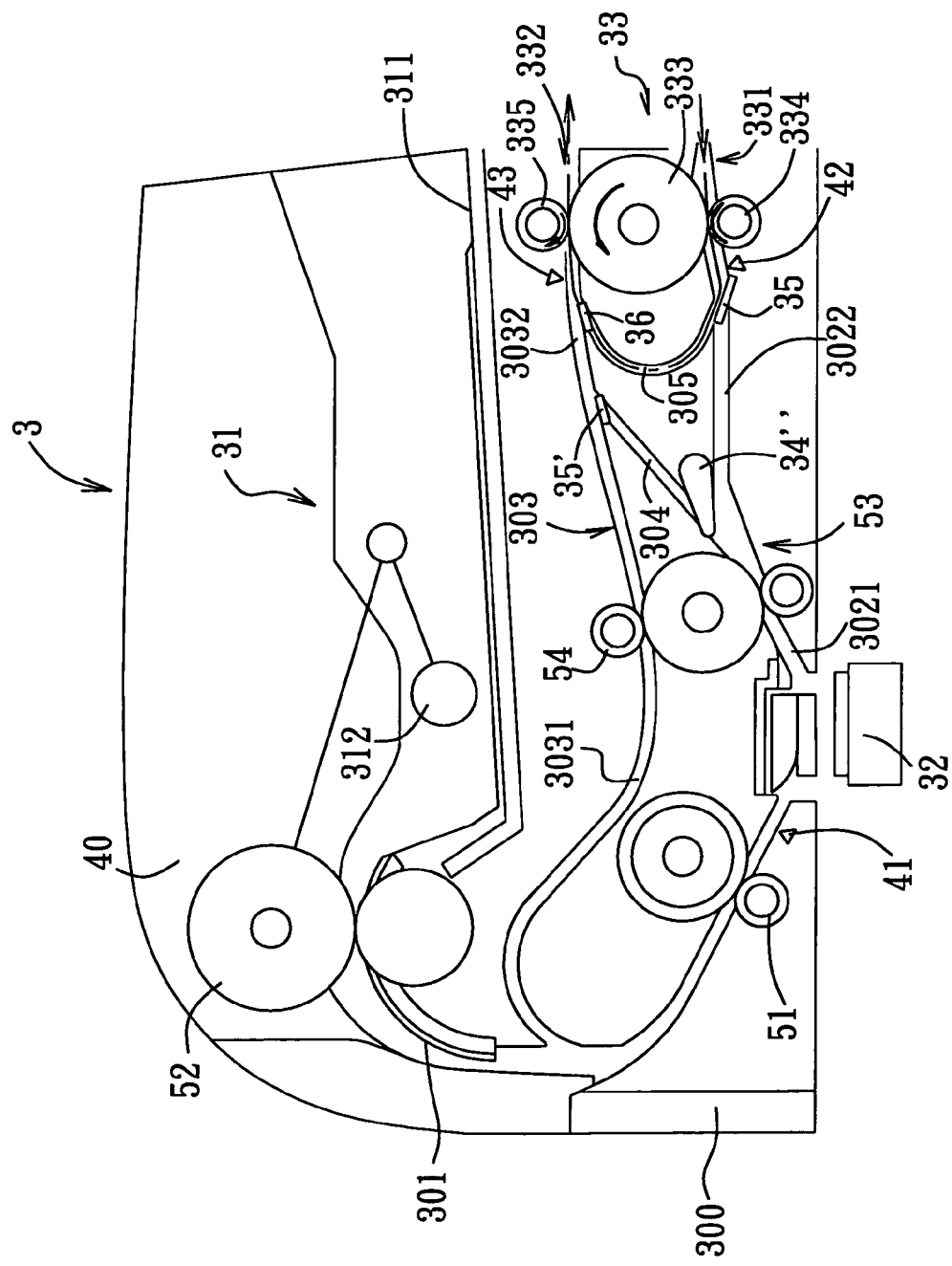
FIG. 12 is a schematic side view of the third preferred embodiment, illustrating a document-inverting path.

FIGS. 10, 11, and 12 show the third preferred embodiment of a duplex automatic document feeder according to this invention. In contrast to the first preferred embodiment, the fixed guiding member 342 (see FIG. 4) is omitted, the switching gate 34" is disposed directly and pivotally on the housing unit 300, and a fifth path 305 and two one-way valves 35', 36 are added. The switching gate 34" is similarly pivotable between a first position shown in FIG. 10 and a second position shown in FIGS. 11 and 12. When the switching gate 34" is disposed in the first position, the document can be moved from the front section 3021 of the second path 302 onto the fourth path 304. In this state, the document can be moved from the feeding tray 311 onto the second roller unit 332 along a first-side scanning path shown by the phantom lines in FIG. 10. When the switching gate 34" is pivoted to the second position, the document can be moved from the second roller unit 332 onto the first roller unit 331 along a second-side scanning path that is shown by the phantom lines in FIG. 11 and that is defined by the third path 303, a portion of the first path 301 disposed downstream of a front end of the third path 303, and the second path 302. Subsequently, the document can be moved from the first roller unit 331 onto the second roller unit 332 via a U-shaped document-inverting path that is shown by the phantom lines in FIG. 12 and that is defined by the fifth path 305 and the rear sections 3022, 3032 of the second and third paths 302, 303. The one-way valve 35' is disposed at the junction between the third and fourth paths 303, 304, and has the same function as that of the second preferred embodiment. The one-way valve 36 is also in the form of a polyester film, and is disposed at the junction between the third and fifth paths 303, 305 so as to allow for movement of the document from the fifth path 305 onto the rear section 3032 of the third path 303 while preventing movement of the document from the rear section 3032 of the third path 303 onto the fifth path 305.

With this invention thus explained, it is apparent that numerous modifications and variations can be made without departing from the scope and spirit of this invention. It is therefore intended that this invention be limited only as indicated by the appended claims.

We claim:

1. An automatic document feeder comprising:
   a feeding end;
   an outlet end:
   a scanning module adapted to scan a document;
   a first path adapted to guide movement of the document from said feeding end to said scanning module, said first path having an upstream end and a downstream end;
   a reversing mechanism disposed in proximity to said outlet end and including a pair of first and second roller units;
   a second path extending from said downstream end of said first path to said first roller unit and having a front section, and a rear section disposed behind said front section of said second path and in front of said first roller unit;
   a third path spaced apart from said second path and extending between said second roller unit and said first path, said third path having front and rear sections in spatial communication with an intermediate portion of said first path and said second roller unit, respectively;
   a fourth path having an upstream end in spatial communication with a junction between said front and rear sections of said second path, and a downstream end in spatial communication with a junction between said front and rear sections of said third path;
   a housing unit; and
   a guide unit including a switching gate disposed in said housing unit at a junction between said second and fourth paths and pivotable between a first position whereat movement of the document from said front section of said second path onto said rear section of said second path is prevented and whereat movement of the document from said front section of said second path onto said fourth path is allowed, and a second position whereat movement of the document from said front section of said second path onto said fourth path is prevented and whereat movement of the document from said front section of said second path onto said rear section of said second path is allowed;
   wherein said switching gate is configured as a curved rod, and has a middle portion disposed pivotally on said junction between said second and fourth paths, said switching gate being further pivotable to a third position whereat the document is limited to move between said second and fourth paths;
   wherein said guide unit further includes:
   a rotary disk disposed pivotally in said housing unit and having an outer periphery formed with first, second, and third positioning notches, said switching gate being connected fixedly to said rotary disk;
   a solenoid valve including an engaging member biased to move into said first positioning notch when said switching gate is disposed in said first position, into said second positioning notch when said switching gate is disposed in said second position, and into said third positioning notch when said switching gate is disposed in said third position, said solenoid valve being activated so as to remove said engaging member from said switching gate just before said switching gate is rotated in said housing unit.

2. The automatic document feeder as claimed in claim 1, further comprising a housing unit, said switching gate being disposed pivotally in said housing unit and having a free end that is pivotable onto said fourth path so as to prevent movement of the document from said front section of said second path onto said fourth path while allowing movement of the document from said front section of said second path onto said rear section of said second path and that is pivotable onto said rear section of said second path so as to prevent movement of the document from said front section of said second path onto said rear section of said second path while allowing movement of the document from said front section of said second path onto said fourth path.

3. The automatic document feeder as claimed in claim 2, wherein said guide unit further includes a fixed guiding member disposed fixedly in said housing unit and having a curved guiding surface that extends between said rear section of said second path and said fourth path and adapted to guide movement of the document from said rear section of said second path onto said fourth path, said switching gate being disposed pivotally on said fixed guiding member.

4. The automatic document feeder as claimed in claim 1, wherein said second roller unit includes:
   a middle roller disposed between said rear sections of said second and third paths, a rotational direction of said middle roller being changeable, and
   an upper roller in frictional contact with said middle roller and disposed behind said third path; and
   when two opposite side surfaces of the document are to be scanned, the document is fed through said first path for first scanning, after which said switching gate is pivoted to said first position so as to allow the document to be moved from said front section of said second path onto said rear section of said third path via said fourth path and into a space between said middle roller and said upper roller, the rotational direction of said middle roller being changed in response to movement of the document into said space between said middle roller and said upper roller so as to allow the document to be moved onto said first path via said third path, thereby allowing for a subsequent second scanning operation on the document.

5. The automatic document feeder as claimed in claim 4, wherein said first roller unit includes said middle roller and a lower roller in frictional contact with said middle roller and disposed behind said rear section of said second path; and
   when said second scanning operation is completed and when the document is moved onto said front section of said second path, said switching gate is pivoted to said second position so as to allow the document to be moved onto said rear section of said second path and into a space between said middle roller and said lower roller, the rotational direction of said middle roller being changed in response to movement of the document into said space between said middle roller and said lower roller so as to allow the document to be moved from said second path onto said outlet end via said fourth path, said rear section of said third path, and said second roller unit.

6. The automatic document feeder as claimed in claim 5, further comprising a sensor disposed in proximity to said rear section of said second path and said first roller unit and in front of said first roller unit so as to output a signal for activation of said middle roller to rotate just before the document is moved into said space between said middle roller and said lower roller of said first roller unit.

7. The automatic document feeder as claimed in claim 4, further comprising a sensor disposed in proximity to said rear section of said third path and said second roller unit and in front of said second roller unit so as to output a signal for activation of said middle roller to rotate just before the document is moved into said space between said middle roller and said upper roller of said second roller unit.

8. The automatic document feeder as claimed in claim 1, further comprising a feeding tray and a feeding/separating roller, an assembly of said feeding tray and said feeding/separating roller serving as said feeding end, said feeding/separating roller being adapted to move the document from said feeding tray onto said first path.

9. The automatic document feeder as claimed in claim 1, further comprising a solenoid valve for pivoting said switching gate between said first and second positions.

10. The automatic document feeder as claimed in claim 1, further comprising a fifth path in spatial communication with said rear sections of said second and third paths and adapted to guide movement of the document between said rear sections of said second and third paths.

* * * * *